United States Patent
Karimli et al.

(10) Patent No.: US 11,272,353 B2
(45) Date of Patent: Mar. 8, 2022

(54) MULTI-OPERATOR UNIFIED DEVICE DESIGN

(71) Applicant: T-Mobile USA, Inc., Bellevue, WA (US)

(72) Inventors: Yasmin Karimli, Kirkland, WA (US);
Joshua Finger, Covington, WA (US);
Thomas P. Lucht, Seattle, WA (US);
Syed Toaha Ahmad, Renton, WA (US);
Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/985,636

(22) Filed: Aug. 5, 2020

(65) Prior Publication Data

US 2022/0046407 A1 Feb. 10, 2022

(51) Int. Cl.
*H04W 8/18* (2009.01)
*H04W 88/06* (2009.01)

(52) U.S. Cl.
CPC ............ *H04W 8/183* (2013.01); *H04W 88/06* (2013.01)

(58) Field of Classification Search
CPC .............................. H04W 8/183; H04W 88/06

USPC ......................................................... 455/418
See application file for complete search history.

(56) References Cited

U.S. PATENT DOCUMENTS

| | | | |
|---|---|---|---|
| 2014/0349634 A1* | 11/2014 | Kukuchka | H04W 60/00 455/418 |
| 2016/0029204 A1* | 1/2016 | Lalwaney | H04W 8/22 455/418 |
| 2019/0098487 A1* | 3/2019 | Boettger | H04W 76/12 |
| 2021/0068048 A1* | 3/2021 | Chauhan | H04W 88/06 |
| 2021/0120524 A1* | 4/2021 | Palle | H04W 76/28 |

* cited by examiner

*Primary Examiner* — Hirdepal Singh
(74) *Attorney, Agent, or Firm* — Lee & Hayes, P.C.

(57) ABSTRACT

A unified device design is described. In an example, a user device can be designed to be permissibly operable with at least two different service providers such that the user device is associated with static features that are applicable for each of the at least two different service providers and the dynamic features that are applicable for individual ones of the at least two different service providers. In an example, a user device can be associated with a subscriber identity module (SIM) that is associated with a service provider. Based at least in part on using a permission to determine that the service provider is one of the at least two different service providers, a subset of dynamic features that are associated with the service provider can be accessed for configuring the user device with the subset of the dynamic features corresponding to the service provider.

17 Claims, 3 Drawing Sheets

MULTI-OPERATOR UNIFIED DEVICE DESIGN

BACKGROUND

Generally, user devices are locked to prevent users of a service provider (e.g., a telecommunications carrier) from using their devices with other service providers. That is, a service provider can lock a user device by "SIM locking," "carrier locking," or "network locking" the user device to a specific service provider such that the user device is operable only with the service provider and settings on the user device are optimized for the service provider. This prevents the user of the user device from terminating their service with the service provider early and using the user device with another service provider (e.g., with less expensive services, better coverage, etc.). Further, SIM locking or network locking can be useful to prevent theft and fraud. For example, a device that is locked is less attractive to theft if it is not useable on another service provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques described herein are directed to a unified device design. For example, a user device can be designed to be permissibly operable with multiple operators, while still being locked to such operators. That is, in at least one example, the user device can be configurable for operation on each of the multiple operators, without the user device needing to be unlocked. For the purpose of this discussion, an "operator" can be a "service provider," such as a telecommunications carrier or the like.

In at least one example, a user device having a unified device design can be configured with static and dynamic features. The static features can persist regardless of which service provider of multiple service providers the user device is associated with (e.g., as determined by the subscriber identity module (SIM) associated with the user device). That is, the static features can be applicable for each service provider of the multiple service providers and can be operable without conflict.

With respect to the dynamic features, such features can change based on which service provider the user device is intended to operate with. For example, the dynamic features can comprise multiple subsets of features that can correspond to individual of the service providers for which the user device is locked. In an example, a software module (e.g., a "configuration module") can access subsets of the dynamic features based on which service provider of the multiple service providers the user device is associated with (e.g., as determined by the SIM associated with the user device). That is, based on detecting that a user device is associated with a SIM associated with a first service provider of the multiple service providers, the software module can access a subset of the dynamic features associated with the first service provider and can implement such features on the user device. As such, the user device can be operable with the first service provider. If the same user device is later associated with a SIM associated with a second service provider of the mobile service providers, the software module can access a subset of the dynamic features associated with the second service provider and can implement such features on the user device. That is, the user device can be designed to be operable with multiple service providers while the device remains locked on the multiple service providers.

As an example, a user device can be designed to be permissibly operable between a first service provider (e.g., a first telecommunications carrier) and a second service provider (e.g., a second telecommunications carrier). A user of the user device may, or may not, know that the user device is configured for operation with both service providers. For example, packaging, branding, kitting, sales channels, etc. can be associated with either one service provider or the other, even though the user device is operable on networks associated with multiple service providers. The user can request to avail services of the first service provider via the user device (e.g., via a network associated with the first service provider). The first service provider can cause a first SIM to be inserted into, activated, or otherwise associated with, the user device. Based on the first SIM being inserted into, activated, or otherwise associated with, the user device, a software module on the user device can detect the first SIM and activate dynamic features associated with the first service provider. As such the user device can be configured for operation with the first service provider.

In some examples, the user device can be first used with the first service provider and can continue to be used with the first service provider. In other examples, the first SIM can be swapped for a second SIM associated with a second service provider and the user device can be used with the second service provider. That is, if, at a later time, the user desires to obtain services from the second service provider (e.g., due to a merger, transfer of services, or the like), the user can request to avail services of the second service provider. The second service provider can cause a second SIM to be inserted into, activated, or otherwise associated with, the user device. Based on the second SIM being inserted into, activated, or otherwise associated with, the user device, the software module can detect the second SIM and activate dynamic features associated with the second service provider. As such, the user device can be configured for operation with the second service provider (e.g., via a network associated therewith). The user need not purchase a second device for the second service provider.

That is, the first service provider and the second service provider can lock the user device such that it can be used between the two service providers, but not on other service providers. Because the user device is associated with a unified design, the user device can be permissibly operable between the first service provider and the second service provider based at least in part on which SIM is associated with the user device. Such a user device—having a unified design—therefore enables use by a user of the first service provider, a user of the second service provider, and/or a user that transitions between the two service providers without requiring the user device to be unlocked. That is, the user device can be associated with a locked state but can operate in association with different service providers (e.g., on different network types)—using different technologies and services via the unified device design.

Additional details are described below with reference to FIGS. 1-3.

Figure 1:
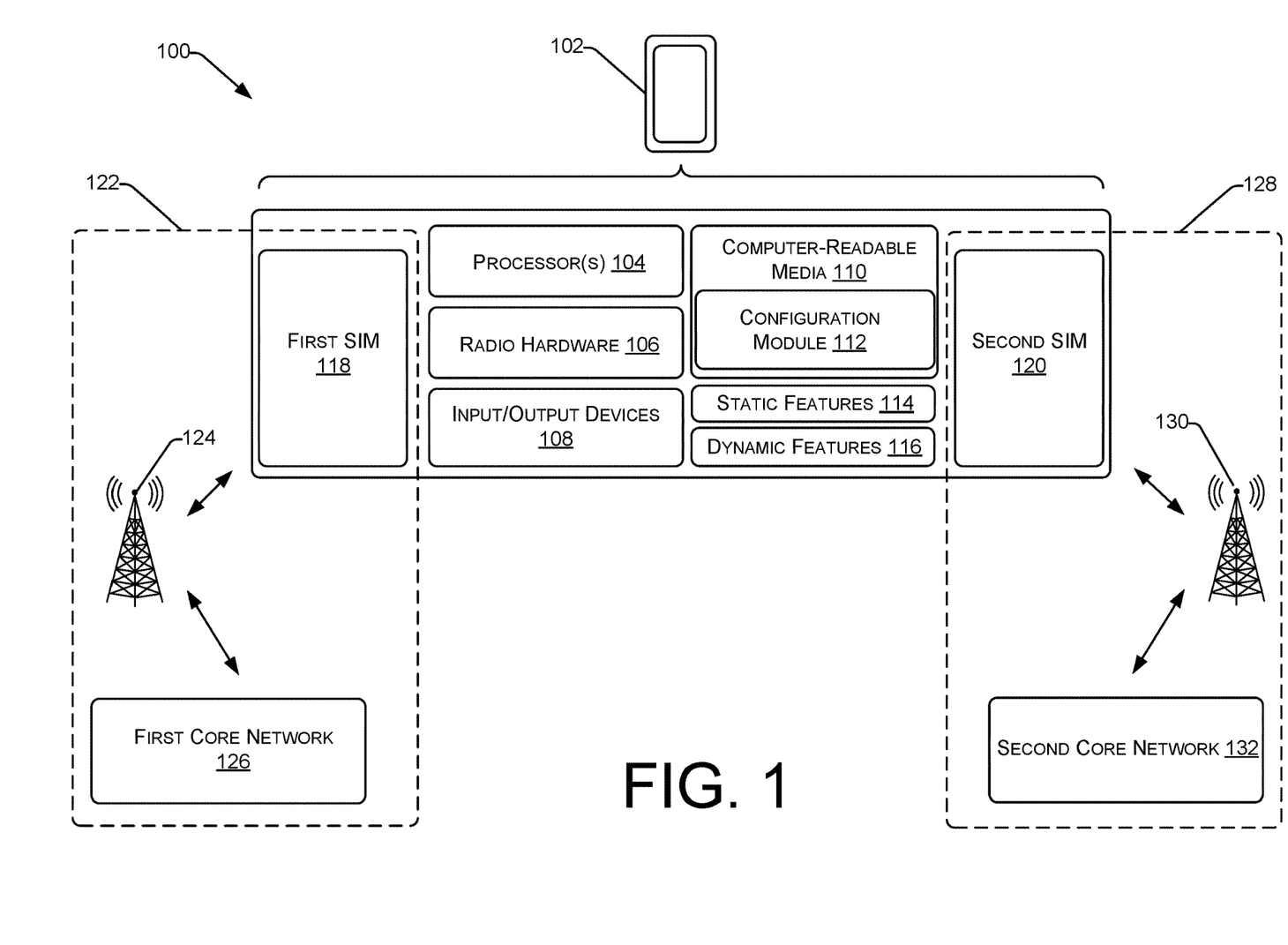
FIG. 1 illustrates an example environment associated with techniques described herein.

FIG. 1 illustrates an example environment 100 associated with techniques described herein. In an example, the environment 100 can include a user device 102, which can have a unified device design. In at least one example, the user device 102 can be configured with processor(s) 104, radio hardware 106, input/output devices 108, and computer-readable media 110.

In at least one example, the user device 102 can be any suitable type of computing device configured to communicate over a wired or wireless service provider, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar user device, as well as situated computing devices including, without limitation, a television (smart television), set-top-box (STB), desktop computer, an IoT device, and the like.

The processor(s) 104 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 104 can execute one or more modules and/or processes to cause the user device 102 to perform a variety of functionalities, as set forth above and explained in further detail in the following disclosure. Additionally, each of the processor(s) 104 can possess its own local memory, which also can store program modules, program data, and/or one or more operating systems.

The radio hardware 106 provides the user device 102 with wireless capabilities, such as connecting to one or more base stations associated with one or more service providers. The radio hardware 106 can include or be incorporated into processors, ASICs, programmable circuits such as FPGAs, or in other ways. In at least one example, the radio hardware 106 can include radios associated with one or more cellular network technologies (e.g., second generation (2G), third generation (3G), fourth generation (4G), fifth generation (5G), etc.). The user device 102 can include additional or alternative hardware to enable the device to access service provider(s) via additional or alternative network(s) (e.g., BLUETOOTH®, etc.).

The radio hardware 106 can configure the user device 102 for transmitting and/or receiving data wirelessly using any suitable wireless communications and/or data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Service provider (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based service provider technology or evolution of an existing IP-based service provider technology.

In at least one example, the user device 102 can be associated with radio hardware 106 available by either or any of the service providers with which the user device 102 is configured to be operable with. For example, if a first service provider supports LTE and CDMA and a second service provider supports LTE, GSM, and UMTS, the radio hardware 106 can support LTE, CDMA, GSM, and UMTS. That is, in some examples, the radio hardware 106 can comprise at least some of the static features associated with the user device 102.

Depending on the exact configuration and type of the user device 102, the computer-readable media 110, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disk read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, service provider attached storage, storage area service providers, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 110 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the user device 102. Any such non-transitory computer-readable media can be part of the user device 102.

In contrast, communication media includes computer readable instructions, data structures, program modules, or other data in a modulated data signal, such as a carrier wave, or other transmission mechanism. As defined herein, computer storage media does not include communication media.

The computer-readable media 110 can include one or more modules and data structures including, for example, a configuration module 112. The one or more modules and data structures can be in the form of stand-alone applications, productivity applications, an operating system component, or any other application or software module to configure the user device 102 to operate with different service providers, as described herein.

In at least one example, the configuration module 112 can configure the user device 102 to operate with different service providers based at least in part on determining with which service provider a SIM associated with the user device 102 is associated. That is, in at least one example, the configuration module 112 can determine that a SIM associated with the user device 102 is associated with a first service provider. Based at least in part on determining that the SIM is associated with the first service provider, the configuration module 112 can determine whether the first service provider is accessible to the user device 102 (i.e., determine whether permission(s) associated with the user device 102 indicate that the user device 102 can access the first service provider). So long as the first service provider is accessible to the user device 102, the configuration module 112 can access dynamic feature(s) associated with the first service provider. That is, the configuration module 112 can retrieve a subset of dynamic feature(s) associated with the first service provider and configure the user device 102 with such dynamic feature(s). As a result, the configuration module 112 can configure the user device 102 to be operable with the first service provider.

Similarly, in at least one example, the configuration module 112 can determine that a SIM associated with the user device 102 is associated with a second service provider. Based at least in part on determining that the SIM is associated with the second service provider, the configuration module 112 can determine whether the second service provider is accessible to the user device 102 (i.e., determine whether permission(s) associated with the user device 102 indicate that the user device 102 can access the second service provider). So long as the second service provider is accessible to the user device 102, the configuration module 112 can access dynamic feature(s) associated with the second service provider. That is, the configuration module 112 can retrieve dynamic feature(s) associated with the second service provider and configure the user device 102 with such dynamic feature(s). As a result, the configuration module 112 can configure the user device 102 to be operable with the second service provider.

In at least one example, the user device 102 can store static features 114. In some examples, a portion of the static features 114 can be stored in the computer-readable media 110. In some examples, a portion of the static features 114 can be stored in association with firmware associated with the computer-readable media 110. In some examples, a portion of the static features 114 can be associated with hardware, such as the radio hardware 106, described above. In at least one example, the static features 114 can be required for operation on each of the service providers with which the user device 102 is permissibly operable. In at least one example, the static features 114 can persist regardless of which SIM is inserted into, activated, or otherwise associated with, the user device 102. That is, the static features 114 can be features that are not in conflict for operation on different service providers. Non-limiting examples of a static feature include radio technology (e.g., NR, LTE, UMTS, CDMA, GSM), a frequency band, voice protocol (e.g., voice on UMTS, CDMA, GSM, etc.), messaging (e.g., SMS), a speed feature (e.g., carrier aggregation (CA), 4×4 multiple input and multiple output (MIMO), or 256QAM modulation in downlink, etc.), regulatory information (e.g., E911 location, wireless emergency alerts (WEA), etc.), dual SIM lock information, dual device unlock information, and the like.

In at least one example, the user device 102 can store dynamic features 116. "Dynamic features," are features that are activated and/or configured on the user device 102 at different times, based on which service provider the user device 102 is operating in association with. That is, the features are not necessarily "dynamic," but the use of such features is dynamic and, as such, such features are referred to as "dynamic features," for the purpose of this disclosure. In some examples, a portion of the dynamic features 116 can be stored in the computer-readable media 110. In some examples, a portion of the dynamic features 116 can be stored in association with firmware associated with the computer-readable media 110. In at least one example, the dynamic features 116 can include different subsets of dynamic features that can be used for configuring the user device 102 to operate on different service providers. That is, each service provider can designate a subset of dynamic features for configuring user devices for operation on the service provider. Dynamic features within a subset can be different so they may not be able to be activated on the user device 102 at the same time. Non-limiting examples of dynamic features 116 include IP multimedia subsystem (IMS) services (e.g., voice over LTE (VoLTE), wi-fi calling (WFC), rich communication services (RCS), etc.), mobile hotspot information, accessibility information (e.g., text telephone (TTY), real time text (RTT), etc.), a service provider service (e.g., visual voicemail, account management, name/identification, etc.), a third-party application, a setting (e.g., access point name (APN), browser default, ringtone, splash screen, etc.), a background (e.g., identification applications, analytics applications, etc.), etc. In at least one example, the dynamic feature(s) associated with each service provider can configure the "look and feel" of the user device 102 for use with the respective service provider and/or can enable the user device 102 to access application(s) and/or service(s) available via the respective service provider.

While several examples of static and dynamic features are described above, additional or alternative static and/or dynamic features can be associated with the user device 102. The user device 102—to have a unified design—can comply with a full set of technical requirements provided by each service provider with which the user device 102 is permissibly operable (e.g., locked).

In at least one example, the user device 102 can be associated with a SIM. In some examples, a SIM can be a SIM card or an eSIM (e.g., an embedded, electronic, and/or enhanced SIM). A SIM card can be a portable memory chip or an integrated memory chip. Generally, when a user opens an account associated with a service provider, the service provider can activate a SIM card, which can be associated with a user device associated with the account of the user.

That is, each SIM card includes a unique number printed on the memory chip which requires activation by the service provider (e.g., via a website associated with the service provider, via a call to the service provider, via provisioning by the service provider, etc.). Following activation of an account by the service provider, the subscriber, via the user device, can utilize various services offered by the service provider.

In some examples, for instance with an eSIM, a profile (e.g., an eSIM profile) including a unique number (i.e., associated with a service provider) and other data (e.g., account information (e.g., subscription key, identity and/or service plan profiles, etc.), restrictions, etc.) can be downloaded by a user device, and no further activation is required to activate an account associated with the service provider and/or otherwise use services available from the service provider. For instance, a local profile assistant (e.g., computer-readable instructions) associated with a user device can download a profile from a service provider and install the profile on the user device. As a result, the eSIM of the user device can be associated with the downloaded profile provided by the service provider. General profile provisioning is defined in GSMA RSP (Remote SIM Provisioning) for consumer devices technical specification standard SGP.22, for example.

In some examples, a SIM (e.g., card or eSIM) can store personal information of a user, such as, but not limited to, data associated with a phone number of a user associated with a user device, an address book of the user, text messages sent and received via the user device, and other data. In at least one example, a SIM can be associated with profile(s) that can be stored on the SIM or can otherwise be accessible by the SIM. In at least one example, a profile can indicate which service plans, services, functionalities, etc. are available for the user device from a particular service provider.

In at least one example, the user device 102 can be configured to be associated with different SIMs, such as a first SIM 118 and/or a second SIM 120. The first SIM 118 can be a SIM card or an eSIM. The second SIM 120 can be a SIM card or an eSIM. In at least one example, the first SIM 118 can configure the user device 102 to operate via a first service provider 122. That is, the first SIM 118 can configure the user device 102 such that the user device 102 can communicate with other user devices via base stations (e.g., the base station 124) and/or network devices associated with the first service provider 122. Base stations (also known as cell sites or cell towers) can be associated with antennae and other electronic communications equipment (e.g., transceivers, digital signal processors, control electronics, a GPS receiver, etc.) to create a cell. A service provider can have multiple base stations, creating multiple cells, thereby generating a cellular network. In at least one example, the first SIM 118 can enable the user device 102 to access services provided via a first core network 126 associated with the first service provider 122. In at least one example, such services can include IMS-based services, including but not limited to, telephony services, emergency services (e.g., E911), gaming services, instant messaging services, presence services, video conferencing services, social networking and sharing services, location-based services, push-to-talk services, and so on.

In at least one example, the second SIM 120 can configure the user device 102 to operate via a second service provider 128. That is, the second SIM 120 can configure the user device 102 to operate via the second service provider 128 such that the user device 102 can communicate with other user devices via base stations (e.g., the base station 130) and/or network devices associated with the second service provider 128. In at least one example, the second SIM 120 can enable the user device 102 to access services provided via the second core network 132 of the second service provider 128. In at least one example, such services can include IMS-based services, including but not limited to, telephony services, emergency services (e.g., E911), gaming services, instant messaging services, presence services, video conferencing services, social networking and sharing services, location-based services, push-to-talk services, and so on.

While two SIMs and two networks are illustrated, in additional or alternative examples, the user device 102 can be configured to be operable with two or more service providers. In such examples, the dynamic features 116 can include dynamic features applicable for each service provider that the user device 102 is configurable to be operable with and the radio hardware 106 can include hardware to enable communication via each of the radio technologies used by each service provider.

Figure 2:
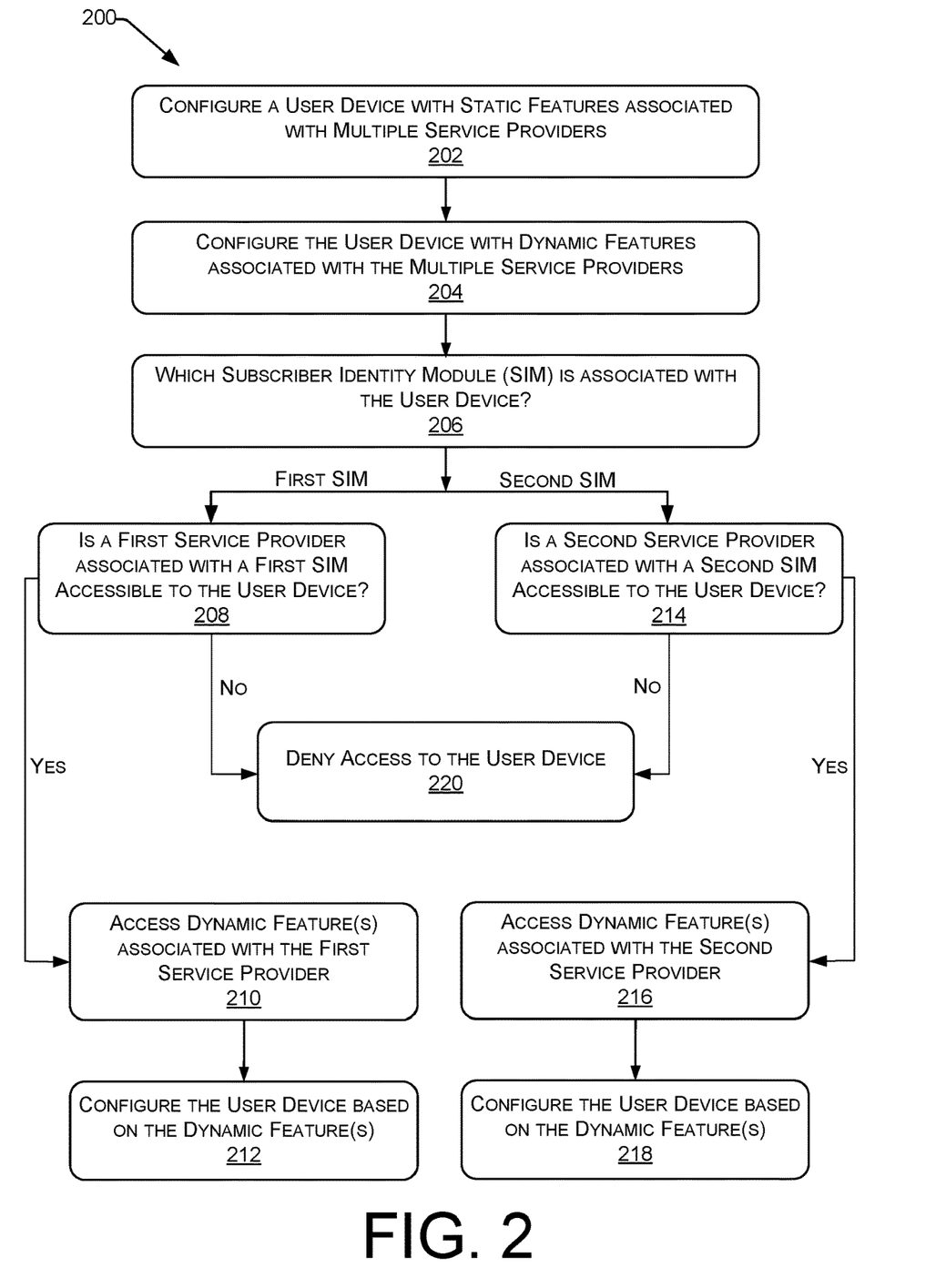
FIG. 2 illustrates an example process for configuring a user device based at least in part on a subscriber identity module (SIM) associated therewith, as described herein.
Figure 3:
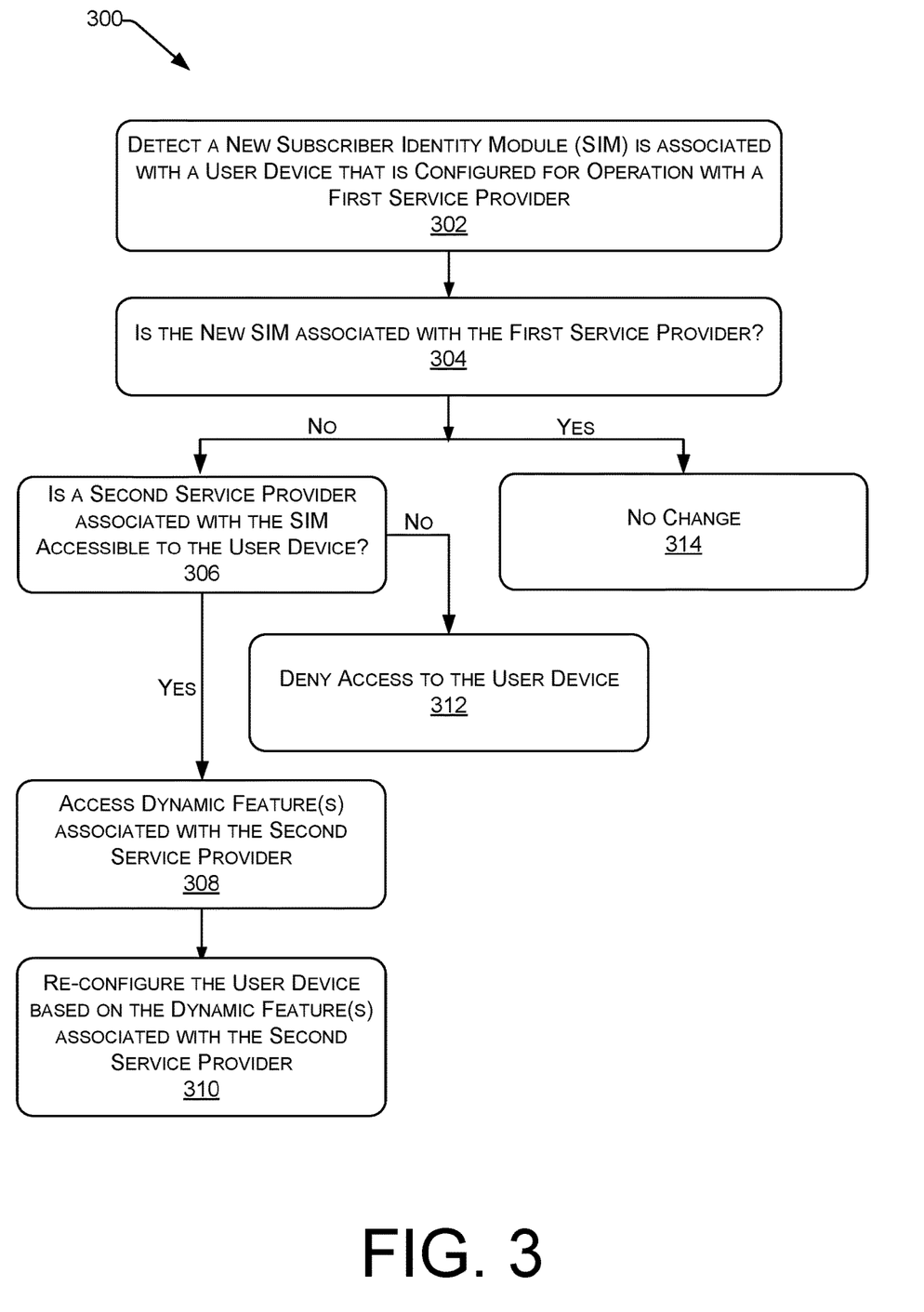
FIG. 3 illustrates an example process for re-configuring a user device based at least in part on a SIM associated therewith, as described herein.

FIGS. 2 and 3 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

FIGS. 2 and 3 are described with reference to components of the example environment described above with reference to FIG. 1. However, FIGS. 2 and 3 are not limited to such an environment and the components described above with reference to FIG. 1 are not limited to performing the operations described below with reference to FIGS. 2 and 3.

FIG. 2 illustrates an example process 200 for configuring a user device based at least in part on a subscriber identity module (SIM) associated therewith, as described herein.

At operation 202, a user device 102 can be configured with static features associated with multiple service providers. As described above, in at least one example, the user device 102 can be configured with static features 114. In some examples, a portion of the static features 114 can be stored in the computer-readable media 110. In some examples, a portion of the static features 114 can be stored in association with firmware associated with the computer-readable media 110. In some examples, a portion of the static features 114 can be associated with hardware, such as the radio hardware 106, described above.

In at least one example, the static features 114 can persist regardless of which SIM is inserted into, or otherwise associated with, the user device 102. That is, the static features 114 can be features that are not in conflict for operation on different service providers. Non-limiting examples of a static feature include radio technology (e.g., NR, LTE, UMTS, CDMA, GSM), a frequency band, voice protocol (e.g., voice on UMTS, CDMA, GSM, etc.), messaging (e.g., SMS), a speed feature (e.g., CA, 4×4 MIMO, or 256QAM modulation in downlink, etc.), regulatory information (e.g., E911 location, WEA, etc.), dual SIM lock information, dual device unlock information, and the like.

At operation 204, the user device 102 can be configured with dynamic features associated with the multiple service providers. As described above, in at least one example, the user device 102 can store dynamic features 116. In some examples, a portion of the dynamic features 116 can be stored in the computer-readable media 110. In some examples, a portion of the dynamic features 116 can be stored in association with firmware associated with the computer-readable media 110. In at least one example, the dynamic features 116 can include different subsets of dynamic features that can be used for configuring the user device 102 to operate on different service providers (e.g., networks associated therewith). That is, each service provider can designate a subset of dynamic features for configuring user devices for operation on the service provider. Dynamic features within a subset can be different so they may not be able to be activated on the user device 102 at the same time. Non-limiting examples of dynamic features 116 include IP multimedia subsystem (IMS) services (e.g., voice over LTE (VoLTE), wi-fi calling (WFC), rich communication services (RCS), etc.), mobile hotspot information, accessibility information (e.g., text telephone (TTY), real time text (RTT), etc.), a service provider service (e.g., visual voicemail, account management, name/identification, etc.), a third-party application, a setting (e.g., access point name (APN), browser default, ringtone, splash screen, etc.), a background (e.g., identification applications, analytics applications, etc.), etc. In at least one example, the dynamic feature(s) associated with each service provider can configure the "look and feel" of the user device 102 for use with the respective service provider and/or can enable the user device 102 to access application(s) and/or service(s) available via the respective service provider.

In at least one example, the user device 102 can be configured with the static features 114 and the dynamic features 116 and packaged, kitted, or otherwise prepared for sale via a sales channel. In some examples, unified device designs, such as the user device 102 configured with both static features 114 and dynamic features 116, can be packaged, kitted, or otherwise prepared for sale in different packaging, kits, or the like and can be sold via different sales channels associated with different service providers.

At operation 206, the configuration module 112 can determine which subscriber identity module (SIM) is associated with the user device 102. In at least one example, the configuration module 112 can determine whether a SIM associated with the user device 102 is associated with the first service provider 122, the second service provider 128, or the like. In such an example, the configuration module 112 can read data associated with the SIM to access service provider-specific data indicative of which service provider the SIM is associated with. Based at least in part on determining that the SIM is associated with the first service provider 122, the configuration module 112 can determine whether the first service provider 122 is accessible to the user device 102, as illustrated at operation 208. That is, in at least one example, the configuration module 112 can access permission(s) associated with the user device 102 (e.g., such permission(s) can be stored in association with the computer-readable media 110, for example, or can otherwise be accessible to the configuration module 112) and can determine whether the permission(s) associated with the user device 102 indicate that the user device 102 can access services availed via the first service provider 122. In some examples, the configuration module 112 can determine whether the user device 102 is in a locked state associated with another service provider (e.g., an indication which can be associated with the static features 114) and thus is not permitted to access services availed via the first service provider 122. Nevertheless, so long as the first service provider 122 is accessible to the user device 102, the configuration module 112 can access dynamic feature(s) associated with the first service provider 122, as illustrated at operation 210. That is, the configuration module 112 can retrieve a subset of the dynamic feature(s) 116 associated with the first service provider 122 and configure the user device 102 with such dynamic feature(s), as illustrated at operation 212. As a result, the configuration module 112 can activate the dynamic feature(s) associated with the first service provider 122 and configure the user device 102 to be operable with the first service provider 122.

Based at least in part on determining that the SIM is associated with the second service provider 128, the configuration module 112 can determine whether the second service provider 128 is accessible to the user device 102, as illustrated at operation 208. That is, in at least one example, the configuration module 112 can access permission(s) associated with the user device 102 (e.g., such permission(s) can be stored in association with the computer-readable media 110, for example, or can otherwise be accessible to the configuration module 112) and can determine whether the permission(s) associated with the user device 102 indicate that the user device 102 can access services availed via the second service provider 128. In some examples, the configuration module 112 can determine whether the user device 102 is in a locked state associated with another service provider (e.g., an indication which can be associated with the static features 114) and thus is not permitted to access services availed via the second service provider 128. Nevertheless, so long as the second service provider 128 is accessible to the user device 102, the configuration module 112 can access dynamic feature(s) associated with the second service provider 128, as illustrated at operation 216. That is, the configuration module 112 can retrieve a subset of the dynamic feature(s) 116 associated with the second service provider 128 and can configure the user device 102 with such dynamic feature(s), as illustrated at operation 218. As a result, the configuration module 112 can activate the dynamic feature(s) associated with the second service provider 124 and can configure the user device 102 to be operable with the second service provider 128.

In at least one example, if either the first service provider 122 or the second service provider 128 is not accessible to the user device 102—for example, if the user device 102 is associated with a locked state that does not enable access to either of the service providers—or if the first service provider 122 or the second service provider 128 is not accessible to the user device 102 for another reason, the configuration module 112 can deny access to the user device 102, as illustrated at operation 220.

In some examples, the user device 102 can be first used with the first service provider 122 and can continue to be used with the first service provider 122. In other examples, the first SIM 118 can be swapped for a second SIM 120 associated with the second service provider 128 and the user device 102 can be re-configured for use with the second service provider 128. FIG. 3 illustrates an example process 300 for re-configuring a user device based at least in part on a SIM associated therewith, as described herein.

At operation 302, the configuration module 112 can detect a new subscriber identity module (SIM) is associated with a user device 102 that is configured for operation with a first service provider 122. In some examples, SIMs associated with user devices, such as the user device 102, can be removable (e.g., a SIM card) or re-programmable (e.g., an eSIM). In at least one example, the user device 102 can be associated with the first SIM 118 and thus can be configured for operation with a first service provider, as described above. In some examples, a new SIM can be detected by the configuration module 112.

In some examples, the configuration module 112 can detect a new SIM based at least in part on detecting the removal of a SIM card and insertion of a new SIM card. In other examples, the configuration module 112 can detect a new SIM based at least in part on a notification sent from the service provider associated with the new SIM to the user device 102. In some examples, the configuration module 112 can perform a periodic check of the SIM and/or can check the SIM after a lapse of a period of time, for example to ensure the user device 102 is properly configured and optimized for use with the proper service provider.

At operation 304, the configuration module 112 can determine whether the new SIM is associated with the first service provider. In at least one example, the configuration module 112 can determine whether the new SIM associated with the user device 102 is associated with the first service provider 122, the second service provider 124, or the like. In such an example, the configuration module 112 can read data associated with the new SIM to access service provider-specific data indicative of which service provider the new SIM is associated with and to determine whether re-configuration is necessary.

At operation 306, the configuration module 112 can determine whether a second service provider associated with the SIM is accessible to the user device. Based at least in part on determining that the SIM is not associated with the first service provider 122 and is associated with a (e.g., new) second service provider 128, the configuration module 112 can determine whether the second service provider 128 is accessible to the user device 102. That is, in at least one example, the configuration module 112 can access permission(s) associated with the user device 102 (e.g., such permission(s) can be stored in association with the computer-readable media 110, for example, or can otherwise be accessible to the configuration module 112) and can determine whether the permission(s) associated with the user device 102 indicate that the user device 102 can access services availed via the second service provider 128. In some examples, the configuration module 112 can determine whether the user device 102 is in a locked state associated with another service provider and thus is not permitted to access services availed via the second service provider 128.

Nevertheless, so long as the second service provider 128 is accessible to the user device 102, the configuration module 112 can access dynamic feature(s) associated with the second service provider 128, as illustrated at operation 308. That is, the configuration module 112 can retrieve a subset of the dynamic feature(s) 116 associated with the second service provider 128 and can re-configure the user device 102 with such dynamic feature(s), as illustrated at operation 310. As a result, the configuration module 112 can re-configure the user device 102 to be operable with the second service provider 128. That is, if, at a later time, the user desires to obtain services from the second service provider 128 (e.g., due to a merger, transfer of services, or the like), based at least in part on the second SIM 120 being inserted into, or otherwise associated with, the user device 102, the configuration module 112 can detect the second SIM 120 and activate dynamic feature(s) associated with the second service provider 128. As such the user device can be re-configured for operation with the second service provider 128 and the user need not purchase a second device for the second service provider 128.

In at least one example, if the second service provider 128 is not accessible to the user device 102, the configuration module 112 can deny access to the user device 102, as illustrated at operation 312. Furthermore, if the new SIM is associated with the first service provider 122, the configuration module 112 can determine that no change is necessary, as illustrated at operation 314.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

What is claimed is:

1. A user device that is locked in associated with at least two different service providers, the user device comprising:
    one or more processors; and
    one or more non-transitory computer-readable media storing instructions that when executed by the one or more processors, cause the user device to perform operations comprising:
        determining that a first subscriber identity module (SIM) is associated with the user device, wherein the first SIM is associated with a first service provider;
        determining, based at least in part on a permission associated with the user device, that the first service provider is one of the at least two different service providers;
        based at least in part on determining that the first service provider is one of the at least two different service providers, accessing a first subset of dynamic features that is associated with the first service provider, wherein the user device is associated with static features that are applicable for each of the at least two different service providers and the dynamic features that are applicable for individual ones of the at least two different service providers;
        configuring the user device based at least in part on the first subset of the dynamic features; and
        re-configuring the user device with a second subset of dynamic features based at least in part on determining that a second SIM is associated with the user device instead of the first SIM, wherein the second SIM is associated with a second service provider and the second subset of dynamic features is associated with the second service provider.

2. The user device as claim 1 recites, wherein the static features comprise one or more of a radio technology, a frequency band, a voice protocol, messaging, a speed feature, regulatory information, dual SIM lock information, or dual device unlock information.

3. The user device as claim 1 recites, wherein the dynamic features comprise one or more of IP multimedia subsystem (IMS) services, mobile hotspot information, accessibility information, a service provider service, a third-party application, a setting, or a background.

4. The user device as claim 1 recites, the operations further comprising:
    determining, based at least in part on determining that the second SIM is associated with the user device and the permission associated with the user device, that the second service provider is one of the at least two different service providers; and based at least in part on determining that the second service provider is one of the at least two different service providers, accessing the second subset of dynamic features that are associated with the second service provider.

5. The user device as claim 1 recites, wherein the first subset of dynamic features and the second subset of dynamic features are different.

6. The user device as claim 1 recites, wherein at least some of the static features and the dynamic features are stored in firmware associated with a portion of the one or more non-transitory computer-readable media.

7. The user device as claim 1 recites, wherein the first SIM comprises a SIM card or an electronic SIM.

8. The user device as claim 1 recites, further comprising radio technology hardware associated with the at least two different service providers.

9. A method, implemented by a user device that is permissibly operable with at least two different service providers, comprising:

determining that a first subscriber identity module (SIM) is associated with the user device, wherein the first SIM is associated with a first service provider;

determining, based at least in part on a permission associated with the user device, that the first service provider is one of the at least two different service providers;

based at least in part on determining that the first service provider is one of the at least two different service providers, accessing a first subset of dynamic features that is associated with the first service provider, wherein the user device is associated with static features that are applicable for each of the at least two different service providers and the dynamic features that are applicable for individual ones of the at least two different service providers;

configuring the user device based at least in part on the first subset of the dynamic features; and re-configuring the user device with a second subset of dynamic features based at least in part on determining that a second SIM is associated with the user device, wherein the second SIM is associated with a second service provider of the at least two different service providers and the second subset of dynamic features is associated with the second service provider.

10. The method as claim 9 recites, wherein the static features comprise one or more of a radio technology, a frequency band, a voice protocol, messaging, a speed feature, regulatory information, dual SIM lock information, or dual device unlock information.

11. The method as claim 9 recites, wherein the dynamic features comprise one or more of IP multimedia subsystem (IMS) services, mobile hotspot information, accessibility information, a service provider service, a third-party application, a setting, or a background.

12. The method as claim 9 recites, wherein the first subset of dynamic features and the second subset of dynamic features are different.

13. The method as claim 9 recites, wherein the user device is permissibly operable with the at least two different service providers based at least in part on being (i) locked in association with the at least two different service providers and (ii) configurable for operation between each of the at least two different service providers.

14. One or more non-transitory computer-readable media storing instructions that when executed by one or more processors, cause a user device that is permissibly operable with at least two different service providers to perform operations comprising:

determining that the user device is associated with a first subscriber identity module (SIM), wherein the first SIM is associated with a first service provider;

determining, based at least in part on a permission associated with the user device, that the first service provider is one of the at least two different service providers;

based at least in part on determining that the first service provider is one of the at least two different service providers, accessing a first subset of dynamic features that is associated with the first service provider, wherein the user device is associated with static features that are applicable for each of the at least two different service providers and the dynamic features that are applicable for individual ones of the at least two different service providers;

configuring the user device based at least in part on the first subset of the dynamic features; and re-configuring the user device with a second subset of dynamic features based at least in part on determining that a second SIM is associated with the user device, wherein the second SIM is associated with a second service provider of the at least two different service providers and the second subset of dynamic features is associated with the second service provider.

15. The one or more non-transitory computer-readable media as claim 14 recites, wherein the static features comprise one or more of a radio technology, a frequency band, a voice protocol, messaging, a speed feature, regulatory information, dual SIM lock information, or dual device unlock information.

16. The one or more non-transitory computer-readable media as claim 14 recites, wherein the dynamic features comprise one or more of IP multimedia subsystem (IMS) services, mobile hotspot information, accessibility information, a service provider service, a third-party application, a setting, or a background.

17. The one or more non-transitory computer-readable media as claim 14 recites, wherein the first subset of dynamic features and the second subset of dynamic features are different.

* * * * *